United States Patent
McDonald

[15] 3,656,337
[45] Apr. 18, 1972

[54] SCALE CALIBRATION CHECKING DEVICE

[72] Inventor: Ralph R. McDonald, Carlsban, N. Mex. 88220

[22] Filed: Jan. 19, 1971

[21] Appl. No.: 107,734

[52] U.S. Cl..................................73/1 B, 177/1, 177/50, 177/164, 177/151, 177/119, 177/210
[51] Int. Cl................G01c 25/00, G01g 19/52, G01g 23/00
[58] Field of Search................177/1, 50, 119, 164, 151–153, 177/210, 211; 73/1 B

[56] References Cited

UNITED STATES PATENTS

| | | | |
|---|---|---|---|
| Re.18,421 | 4/1932 | Thomas | 177/1 |
| 2,882,035 | 4/1959 | Lauler et al. | 177/211 X |
| 2,974,518 | 3/1961 | Jones | 73/1 B |
| 3,396,573 | 8/1968 | Blubaugh | 73/1 B |
| 3,405,774 | 10/1968 | Laroche | 177/50 X |

FOREIGN PATENTS OR APPLICATIONS

| | | | |
|---|---|---|---|
| 1,242,892 | 6/1967 | Germany | 177/50 |
| 1,100,117 | 1/1968 | Great Britain | 177/50 |

*Primary Examiner*—Robert S. Ward, Jr.
*Attorney*—Clarence A. O'Brien and Harvey B. Jacobson

[57] ABSTRACT

A pivoted scale beam type of weighing device senses the weight of articles traveling on a continuously moving conveyor belt. The conveyor belt is periodically displaced upwardly from the weighing device during test intervals to check calibration by simultaneously removing the load of the conveyor from the weighing device while transferring a reference weight thereto. The weighing device is automatically adjusted during each test interval if there is a deviation from a proper reference reading.

10 Claims, 3 Drawing Figures

Ralph R. McDonald
INVENTOR.

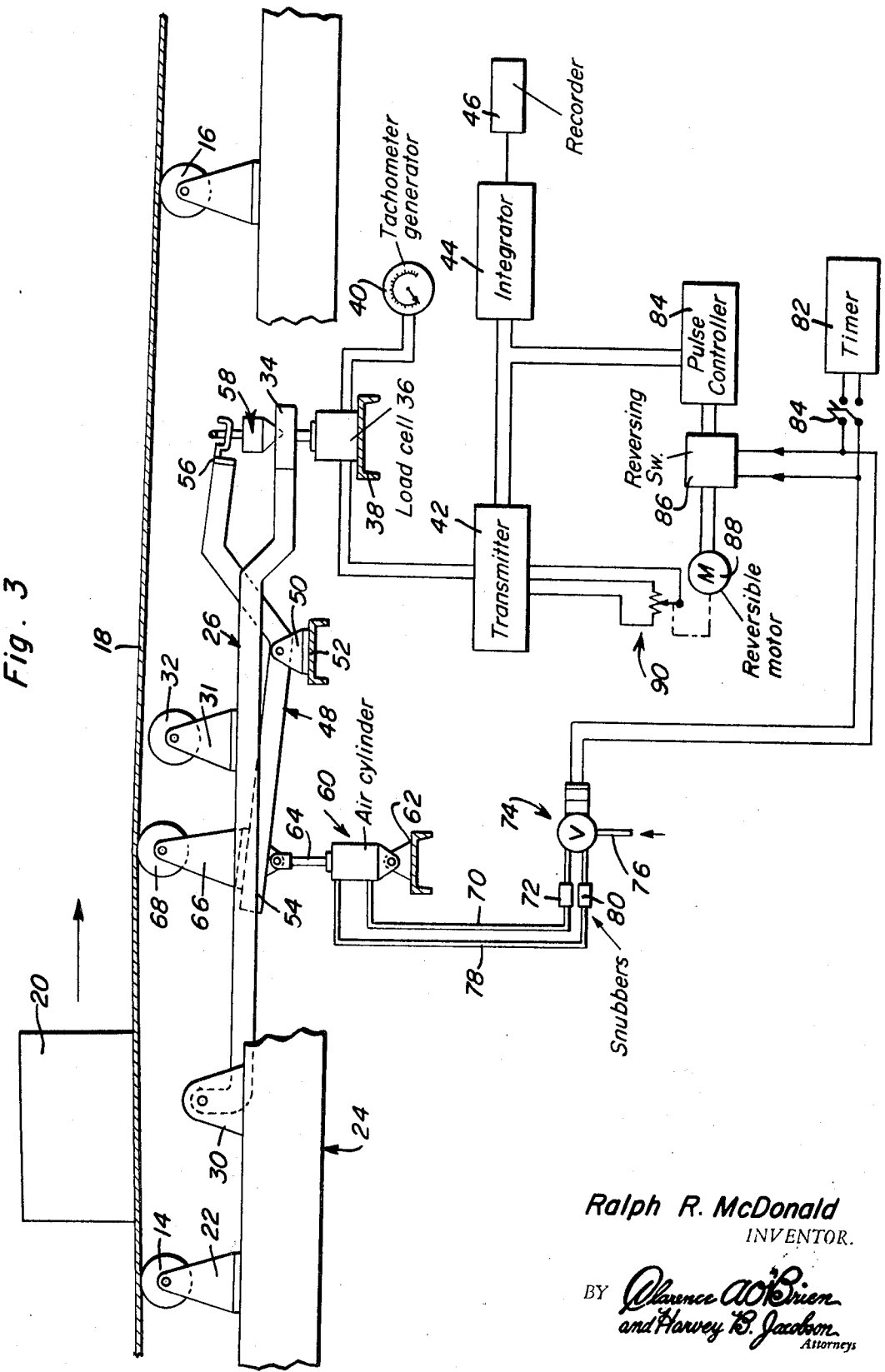

SCALE CALIBRATION CHECKING DEVICE

This invention relates to weight sensing systems for article transporting conveyors and more particularly to apparatus for periodically calibrating the weight sensing system.

Weighing systems for articles being transported along a predetermined path by a conveyor are well known. Because of the prolonged and continual operation of such weighing systems, recalibration is often required in order to maintain consistent and accurate weight measurements. In the past, operation of the conveyor had to be temporarily interrupted each time the weighing system was to be checked and recalibrated if necessary. This checking procedure not only required the attention of personnel but also involved a loss of production time because of the interruption in conveyor operation.

It is therefore an important object of the present invention to provide a weighing system for products traveling on a continuously moving conveyor wherein the weighing system may be automatically recalibrated if necessary during repeated test intervals without any interruption in conveyor operation.

A further object is to periodically establish the aforementioned test intervals during which the calibration of the weighing system is checked out.

In accordance with the present invention, timer controlled activating means is periodically operative to displace a continuously moving conveyor belt from operative relation to a weighing scale beam and at the same time transfer a test weight to the load scale associated with the weighing system for the purpose of checking the calibration of the weighing system. The load is sensed at the end of the scale beam whether it be the load on the conveyor or a reference weight and the weight measurements are recorded by means of a strip chart recorder. During the test interval, while the load of the reference weight is being sensed, and recorded, if there is any deviation from a predetermined recorded output, a corresponding signal is transmitted by a pulse controller to a reversing switch assembly for energization of a reversible motor which is operative through an adjustable impedance or potentiometer to adjust a signal transmitter or amplifier through which the load sensing signal is processed prior to being recorded. Toward this end, the set point of the pulse controller is adjusted so as to equal the load signal produced by the reference weight. Thus, during the test interval, an automatic zero adjustment is effected. At the end of the test interval, the conveyor belt is restored to its operative relationship to the weighing scale beam in order to resume normal weighing operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a diagrammatic view illustrating the system of the present invention.

Figure 1:
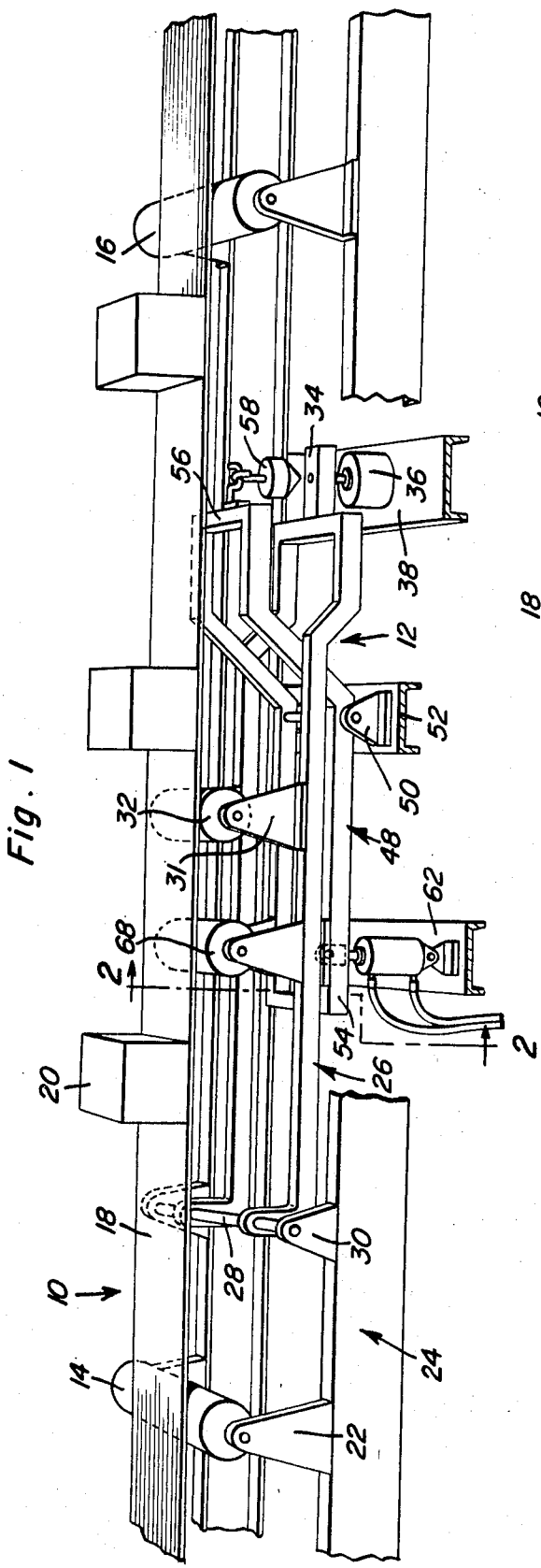
FIG. 1 is a perspective view showing the apparatus associated with the present invention.
Figure 2:
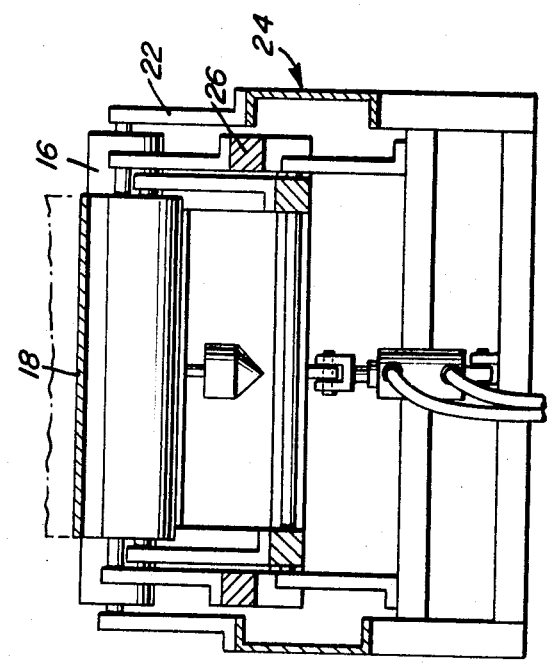
FIG. 2 is a transverse sectional view taken substantially through a plane indicated by a section line 2—2 in FIG. 1.

Referring now to the drawings in detail, FIGS. 1 and 2 illustrate a continuously moving conveyor generally denoted by reference numeral 10 associated with a weighing and calibrating system generally referred to by reference numeral 12 generally located between a pair of support rollers 14 and 16 supporting the upper run of an endless conveyor belt 18 associated with the conveyor on which products or articles 20 are transported in one direction. The supporting rollers for the upper run of the conveyor belt are rotatably mounted by suitable brackets 22 on a frame assembly 24 associated with the conveyor. The conveyor is maintained in continuous operation for movement of the articles 20 in a right hand direction as viewed in FIG. 1 with the articles thereon moving through a weighing station between the support rollers 14 and 16 so that the weight of the articles may be sensed by the weighing system 12 which is also periodically checked and automatically adjusted if recalibration is necessary.

The weighing system includes a scale beam assembly 26 which is pivotally mounted at one end by a pivot shaft 28 supported between brackets 30 on the conveyor frame assembly adjacent to the support roller 14 but spaced downstream therefrom in the direction of travel of the articles 20. The scale beam assembly 26 underlies the upper run of the conveyor belt 18 and mounts intermediate the ends thereof, a pair of brackets 30 for rotatably supporting a load applying roller 32 which is normally held in engagement with the underside of the conveyor belt 18 so that the load on the conveyor belt may be applied to the scale beam assembly 26. The end of the scale beam assembly 26 remote from the pivot shaft 28, is provided with an arm 34 to which a load cell 36 is connected, the load cell being mounted on a supporting frame member 38 underlying the arm 34. The load cell is of any suitable type well known to those skilled in the art, the details of which form no part of the present invention.

As shown in FIG. 3, the load cell 36 is connected to a source of voltage in the form of a tachometer generator 40 in order to produce a signal output reflecting the load applied to the load cell through the arm 34 on the end of the scale beam assembly 26. The output signal from the load cell is fed to an amplifier transmitter 42 from which an amplified output is fed to an integrator component 44 producing a suitable output adapted to be registered on a strip chart by recorder 46. The transmitter, integrator and recorder components are well known, commercially available items the details of which form no part of the present invention. Thus, the load signal output of load cell 36 is appropriately processed and recorded in a manner well known to those skilled in the art.

Also underlying the top run of conveyor belt 18 between the support rollers 14 and 16, is a test beam assembly 48 which is pivotally mounted by a fulcrum bracket assembly 50 intermediate the ends thereof. A support frame 52 mounts the fulcrum assembly 50 intermediate the ends of the scale beam assembly 26 so that one end portion 54 of the test beam assembly 48 may underlie the scale beam assembly while the other end portion 56 may project upwardly through the scale beam assembly and overlie the arm 34. A reference weight 58 is suspended from the end portion 56 of the test beam assembly on one side of the fulcrum assembly 50 so that the load thereof may be transferred to the arm 34 in response to angular displacement of the test beam assembly 48 in a clockwise direction about the fulcrum assembly 50 as viewed in FIGS. 1 and 3. The test beam assembly is angularly displaced in this direction in order to transfer the reference weight 58 to the load cell 36 by means of a power operated device in the form of an air cylinder mechanism 60. The air cylinder mechanism is pivotally anchored on a support frame 62 underlying the end portion 54 of the test beam assembly while a piston rod 64 extends upwardly from the air cylinder mechanism and is pivotally connected to the end portion 54. The end portion 54 of the test beam assembly furthermore carries brackets 66 for rotatably mounting a load elevating roller 68 located just upstream of the load applying roller 32 associated with the scale beam assembly 26. It will therefore be apparent that in response to upward displacement of the end portion 54 of the test beam assembly 48 transferring the reference weight 58 to the load cell, the roller 68 will at the same time upwardly displace the conveyor belt to disengage it from the load applying roller 32 as shown in FIG. 3 so that the conveyor will no longer be in operative relation to the weighing system. However, the conveyor may continue to operate.

The air cylinder mechanism 60 is rendered operative during a test interval to upwardly displace the conveyor belt 18 and transfer the reference weight to the load cell when supplied with air under pressure through line 70, as shown in FIG. 3, connected by a snubber 72 to one of the outlet ports of a solenoid valve assembly 74 connected to a suitable source of air under pressure by inlet 76. At the end of the test interval, normal weighing operation is restored by pressurizing the line 78 interconnecting the air cylinder mechanism 60 with the solenoid valve assembly 74 through snubber 80.

The solenoid valve assembly 74 is activated by energizing voltages supplied thereto from an adjustable timer component 82 upon closing of a manual switch 84. Any suitable process timer may be utilized for this purpose, the details of which form no part of the present invention. Thus, the timer component is operative to determine the frequency with which the weighing system is checked for calibration as well as the duration of the test interval during which calibration is checked and automatic adjustment effected if necessary. The output of the transmitter component 42 is connected to the integrator component 44 through a pulse duration controller component 84 of a commercially available type well known to those skilled in the art. Thus, the pulse controller may be set in order to detect any deviation of variation from the reference weight reading obtained on the recorder 44. Accordingly, if the output signal from the transmitter 42 does not correspond to the initial reference weight signal, an output will be obtained from the pulse controller 82 in a positive or negative direction which is operative through the reversing switch assembly 86 to energize a reversible motor 88 during the aforementioned test interval established under control of the timer component 82. When the motor 88 is energized for rotation in either direction, it will correspondingly readjust potentiometer control 90 for the transmitter component 42 to thereby automatically adjust the output of the transmitter cancelling the change, deviation or variation from the original reference weight reading. The test interval is of course set by the timer 82 in order to permit completion of the zero adjustment. At the end of the test interval, the output of the timer component 82 is such as to operate the solenoid valve assembly 74 to lower the end portion 54 of the test beam 48 thereby restoring the conveyor to its normal condition in relation to the weighing system by lowering the belt 18 back onto the load applying roller 32.

The foregoing is considered as illustrative only of the principles of the invention. Further, since numerous modifications, and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a continuously moving conveyor on which articles travel past a weighing station at which a weighing device senses the weight of said articles, a system for calibrating the weighing device comprising means for displacing the conveyor from operative relation to the weighing device during a test interval, means responsive to said displacement of the conveyor for loading the weighing device with a reference weight, means connected to the weighing device for detecting variations in the weight registered by the weighing device during the test intervals and adjustment means connected to said weighing device for canceling said variations.

2. The combination of claim 1 wherein said weighing device comprises a pivoted scale beam, load applying means mounted by the scale beam for engagement with the conveyor, load sensing means in engagement with the scale beam for producing a signal in response to displacement of the scale beam, a recorder, and signal processing means connecting the sensing means to the recorder.

3. The combination of claim 2 wherein said conveyor displacing means includes load elevating means engageable with the conveyor upstream of the weighing device in the direction of travel of the articles, and power operated means connected to the load elevating means for displacement thereof into engagement with the conveyor and timer means for periodically activating the power operated during said test intervals.

4. The combination of claim 3 wherein said conveyor comprises an endless belt, and rollers supporting the belt both upstream and downstream of the load applying and elevating means.

5. The combination of claim 4 wherein said displacement responsive means comprises a test beam having opposite end portions, a fulcrum pivotally supporting the test beam between said opposite end portions, said load elevating means being mounted on one of said end portions and said reference weight being carried by the other of the end portions overlying the load sensing means of the weighing device.

6. The combination of claim 5 wherein the adjustment means includes adjustable impedance means connected to the signal processing means, a reversible motor drivingly connected to the impedance means, and reversing switch means connecting the detecting means to the motor for operation thereof.

7. The combination of claim 1 wherein said conveyor displacing means includes load elevating means engageable with the conveyor upstream of the weighing device in the direction of travel of the articles; and power operated means connected to the load elevating means for displacement thereof into engagement with the conveyor and timer means for periodically activating the power operated during said test intervals.

8. The combination of claim 7 wherein the adjustment means includes adjustable impedance means connected to the signal processing means, a reversible motor drivingly connected to the impedance means, and reversing switch means connecting the detecting means to the motor for operation thereof.

9. The combination of claim 2 wherein said displacement responsive means comprises a test beam having opposite end portions, a fulcrum pivotally supporting the test beam between said opposite end portions, said load elevating means being mounted on one of said end portions and said reference weight being carried by the other of the end portions overlying the load sensing means of the weighing device.

10. The combination of claim 1 wherein the adjustment means includes adjustable impedance means connected to the signal processing means, a reversible motor drivingly connected to the impedance means, and reversing switch means connecting the detecting means to the motor for operation thereon.

* * * * *